(12) United States Patent
Doner et al.

(10) Patent No.: US 8,701,551 B2
(45) Date of Patent: Apr. 22, 2014

(54) ADJUSTABLE ANTILIP SYSTEM FOR A PATTY FORMING MACHINE

(75) Inventors: Ralph Edward Doner, Rialto, CA (US); Ronald F. LaBruno, Mount Prospect, IL (US); Joseph Allen Ebert, Lockport, IL (US)

(73) Assignee: Formax, Inc., Mokena, IL (US)

( * ) Notice: Subject to any disclaimer, the term of this patent is extended or adjusted under 35 U.S.C. 154(b) by 1006 days.

(21) Appl. No.: 12/192,883

(22) Filed: Aug. 15, 2008

(65) Prior Publication Data

US 2010/0040752 A1 Feb. 18, 2010

(51) Int. Cl.
  *A47J 37/06* (2006.01)
  *A47J 37/12* (2006.01)
  *B02C 15/00* (2006.01)

(52) U.S. Cl.
  USPC ........... 99/349; 99/353; 99/422; 99/450.6; 99/512; 99/513; 99/517

(58) Field of Classification Search
  CPC .......... A23P 1/10; A23G 3/02; A22C 7/0084; B29C 45/34; Y10S 425/812
  USPC ......... 99/422, 349, 450.6, 353; 425/556, 572, 425/574; 426/353, 512–513, 517
  See application file for complete search history.

(56) References Cited

U.S. PATENT DOCUMENTS

| | | | |
|---|---|---|---|
| 3,887,964 A * | 6/1975 | Richards | 425/556 |
| 3,952,478 A | 4/1976 | Richards | |
| 4,054,967 A | 10/1977 | Sandberg et al. | |
| 4,182,003 A | 1/1980 | Lamartino et al. | |
| 4,329,828 A | 5/1982 | Wagner | |
| 4,334,339 A * | 6/1982 | Holly | 425/562 |
| 4,372,734 A * | 2/1983 | Dolan et al. | 425/131.1 |
| 4,438,686 A * | 3/1984 | Perez | 99/353 |
| 4,614,489 A * | 9/1986 | Juravic | 425/376.1 |
| 4,808,104 A * | 2/1989 | D'Orlando | 425/298 |
| 5,022,843 A * | 6/1991 | Secondiak | 425/289 |
| 5,181,456 A * | 1/1993 | Theys et al. | 99/485 |
| 5,655,436 A * | 8/1997 | Soper | 99/353 |
| 5,730,650 A * | 3/1998 | Soper | 452/174 |
| 6,156,358 A * | 12/2000 | Soper | 426/231 |
| 6,368,092 B1 * | 4/2002 | Lindee et al. | 425/107 |
| 6,416,314 B1 | 7/2002 | LaBruno | |
| 6,749,421 B2 | 6/2004 | Sandberg | |
| 7,014,456 B1 * | 3/2006 | Tournour et al. | 425/572 |
| 7,255,554 B2 | 8/2007 | Lamartino et al. | |
| 2003/0075055 A1 * | 4/2003 | Tournour et al. | 99/427 |
| 2005/0072312 A1 * | 4/2005 | Pasek et al. | 99/353 |
| 2005/0072314 A1 * | 4/2005 | Lindee et al. | 99/353 |
| 2006/0110510 A1 * | 5/2006 | Tournour et al. | 426/513 |
| 2006/0240161 A1 * | 10/2006 | LaBruno et al. | 426/513 |

FOREIGN PATENT DOCUMENTS

| | | |
|---|---|---|
| WO | WO9962344 A1 | 12/1999 |
| WO | WO2005027667 A2 | 3/2005 |

* cited by examiner

*Primary Examiner* — Dana Ross
*Assistant Examiner* — Brett Spurlock
(74) *Attorney, Agent, or Firm* — Klintworth & Rozenblat IP LLC

(57) ABSTRACT

An antilip system for a food patty forming apparatus of the type having a reciprocating mold plate with at least one cavity. The system uses an adjustable escape passage to relieve pressure within a mold plate cavity. The system comprises a breather plate with antilip holes, a passage plate with antilip holes, and an adjusting bar movable between a full open position, a full closed position, and a plurality of intermediate positions. The passage plate also has a passage recycle channel for returning relieved materials to a hopper.

14 Claims, 9 Drawing Sheets

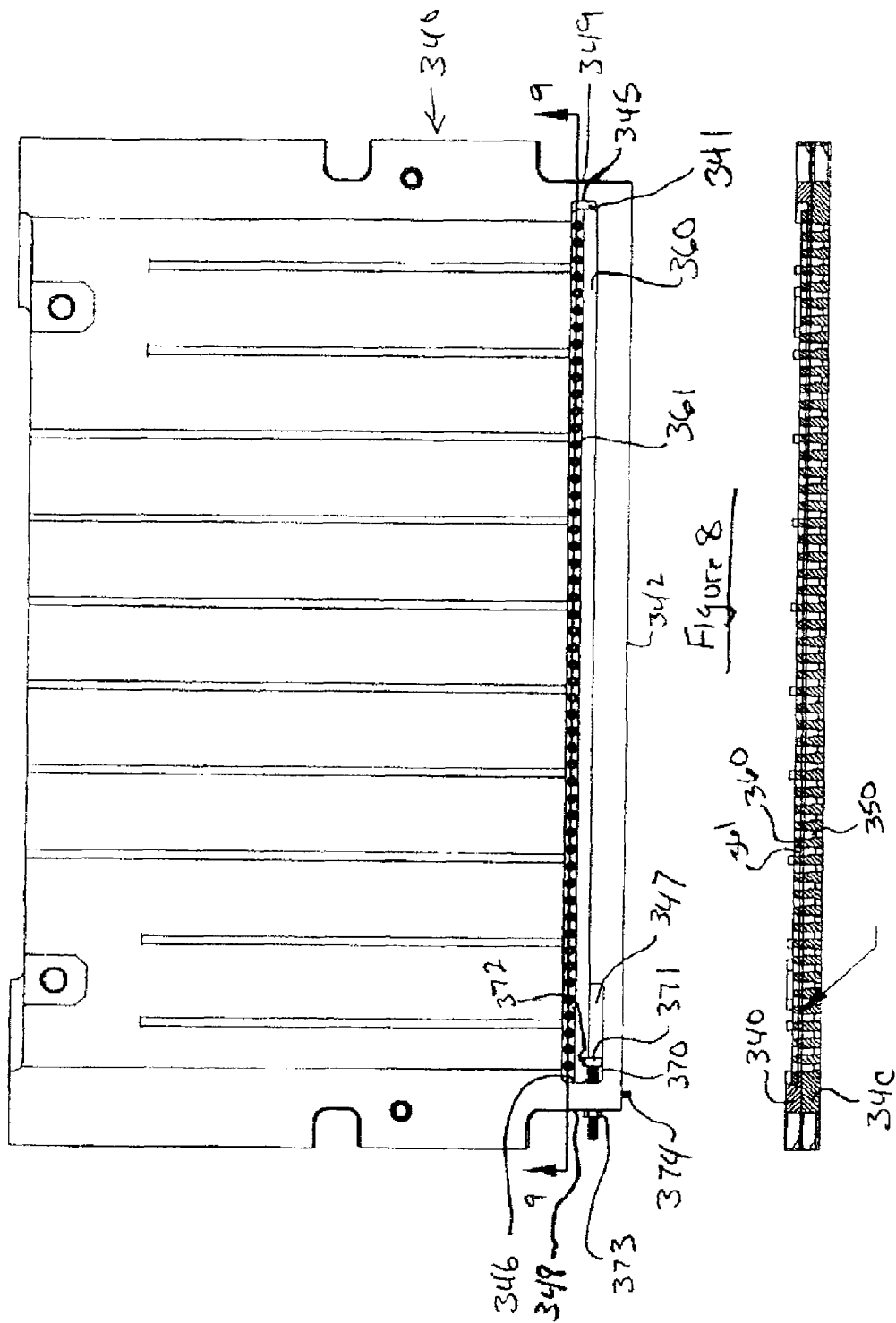

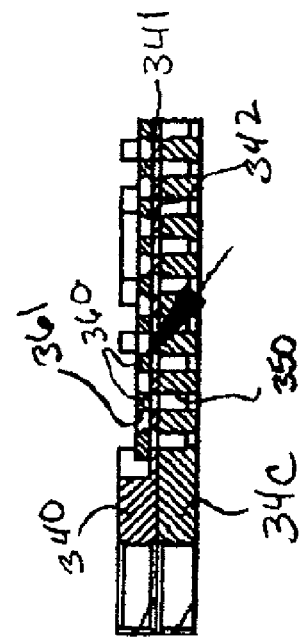
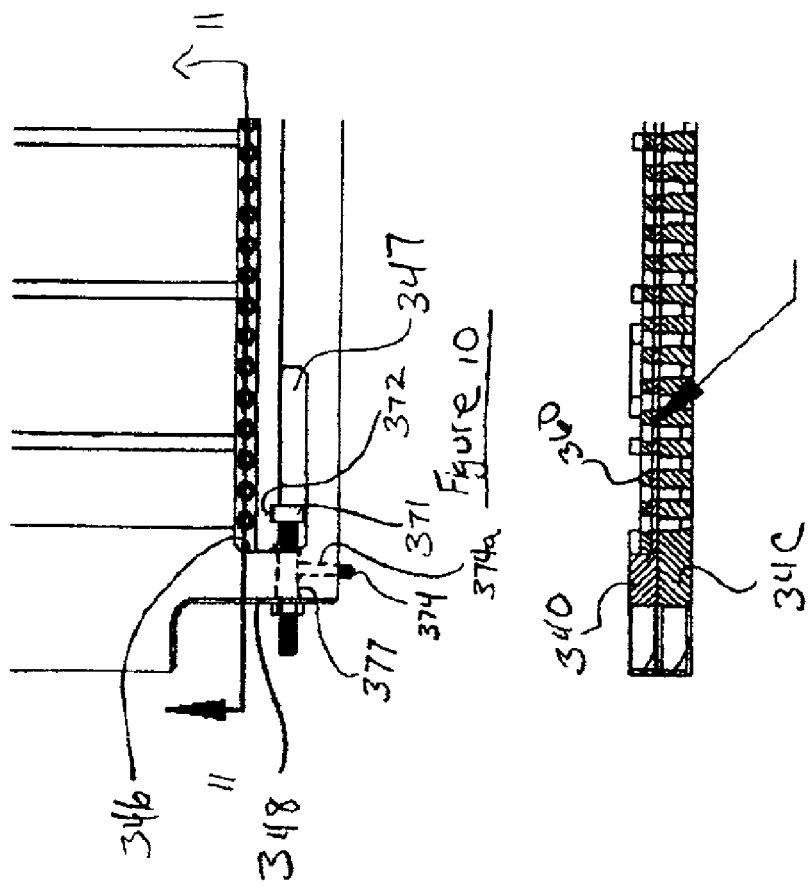

ADJUSTABLE ANTILIP SYSTEM FOR A PATTY FORMING MACHINE

FIELD OF THE INVENTION

The present invention relates to food patty-forming machines. The invention particularly relates to an improved breather plate system.

BACKGROUND OF THE INVENTION

Food patty-forming, or patty-molding, machines are described for example in U.S. Pat. Nos. 3,952,478; 4,054,967; 4,182,003; and 4,329,828, and PCT published applications WO 99/62344, and WO 2005/02766782 A2, herein incorporated by reference. The patty forming machines may be those commercialized by FORMAX Inc. of Mokena, Ill., including the F-26™, ULTRA26™, Maxum700®, F-19™, F400™, F-6™ patty forming machines.

In one type of food patty-forming machine a mold plate, having patty-shaped cavities, is reciprocated between a fill position and a knock out position. The cavities are located above or below a food product delivery apparatus. Within the food product delivery apparatus, the food product, such as ground beef or ground poultry, is pumped by a plunger through a manifold and then upwardly or downwardly through a fill slot and eventually into the mold cavities. When the mold plate is in the fill position, food product is delivered under pressure through the fill slot into the cavities, forming patties.

A breather plate is arranged above or below the mold plate. The breather plate includes breather holes that communicate or express air out of the mold cavities while food product is being filled into the cavities from below or above. The breather holes are typically located at a position with respect to the cavities being filled that is distant from the position of the fill slot, so that a uniform patty shape can be achieved as the air within the mold cavities and within the food product is expelled through the breather holes. During filling, the food product delivered through the fill slot advances through a transverse flow area defined by a width and height of the cavity, through the cavity toward the breather holes. After filling of the cavities, the mold plate is then shifted to the knock out position where the mold cavities are extended forward of the breather plate. The patties are then knocked out of the cavities by a knockout mechanism.

The present inventor recognizes that in addition to the food product material, air is pressurized within the mold cavity. This pressurized air expands in the part of the mold cavity that is first exposed to atmospheric pressure when the mold plate moves from a fill position to a knock out position. The expanding air may cause a lip to form on the portion of the patty.

The present inventor recognizes that it would be desirable to relieve pressurized air within formed patties before the mold cavity is exposed to atmospheric pressure. The present inventor recognizes that relieving pressurized air will reduce or eliminate any lip formation on a patty.

SUMMARY OF THE INVENTION

The invention comprises an improved patty forming apparatus with an adjustable escape passage to relieve pressure within a mold plate cavity. The present inventor recognizes that it would be desirable for the escape passage to vary in the degree to which it is open to control the amount of pressure released through the escape passage. The varying degree of openness may be designed to account for the differing pressures or by the differing characteristics of different types of food product used to form the patties.

The invention contemplates the improved food patty-forming machine of the type having a reciprocating mold plate with at least one cavity. The mold plate reciprocates between a fill position and a knock-out position. The cavity is filled with food product from a fill slot open to one side of the cavity when the cavity is in the fill position. The adjustable escape passage reduces or eliminates the formation of a lip on a food patty by relieving pressure within the mold cavity before the mold plate reaches the knock out position.

The antilip escape passage opening is adjustable to control the amount of air and entrained food product that is removed from the patty. The opening is controlled such that only a sufficient amount of air and food product is removed to prevent a lip and not so much as to cause a depression in the patty. This improves the formed shape of the patty. It improves weight accuracy of the formed patty. The removed material that passes through the escape passage opening will travel back through the passage recycle channels to be recycled internally in the machine, thus reducing waste and increasing yield.

In one embodiment, a mold plate support structure carries the mold plate and guides the mold plate for reciprocating motion along a longitudinal direction. The structure includes a wall facing the mold plate. The mold plate reciprocates along the wall. A food product delivery channel is carried by the structure and arranged on one side of the mold plate. The delivery channel has a fill opening into the cavity when the mold plate is in a fill position with respect to the structure. The wall has an adjustable escape passage for adjustably relieving pressure within the mold cavity.

The escape passage may have at least one antilip hole and an adjusting element for opening or closing the at least one antilip hole. The adjusting element is for varying a degree to which the antilip hole is open. The escape passage may comprise at least one passage recycle channel connected to a hopper for recycling food product relieved into the escape passage.

In another embodiment the top wall comprises a passage plate. The passage plate comprises at least one passage plate antilip hole, and at least one passage recycle channel connecting to a hopper for recycling food product relieved into the escape passage. The at least one passage plate antilip hole at least partially defines the escape passage.

In another embodiment, the passage plate may comprise an antilip hole channel. The antilip hole channel comprises at least one passage plate antilip hole. The adjusting element comprises an adjusting bar fitting in the antilip hole channel.

In another embodiment, the adjusting bar comprises adjusting bar holes that correspond to the one or more passage plate antilip holes. The adjusting bar holes align with the one or more passage plate antilip holes when the adjusting bar is in a full open position.

In another embodiment the top wall comprises a breather plate between the mold plate and the passage plate. The breather plate has at least one breather hole there through open to the cavity when the mold plate is in the fill position. The breather plate comprises breather antilip holes that at least partially define the escape passage.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 8 is a top view of a passage plate with an adjusting bar in an open position;

FIG. 9 is a side view of a passage plate with an adjusting bar in an open position taken along line 9-9 of FIG. 8;

FIG. 10 is an enlarged sectional top view of a passage plate with an adjusting bar in an open position taken from FIG. 8

FIG. 11 is an enlarged sectional side view of a passage plate with an adjusting bar in an open position taken along line 11-11 of FIG. 10; and FIG. 12 is an enlarged sectional side view of a passage plate with an adjusting bar in a closed position.

DETAILED DESCRIPTION

Figure 1:
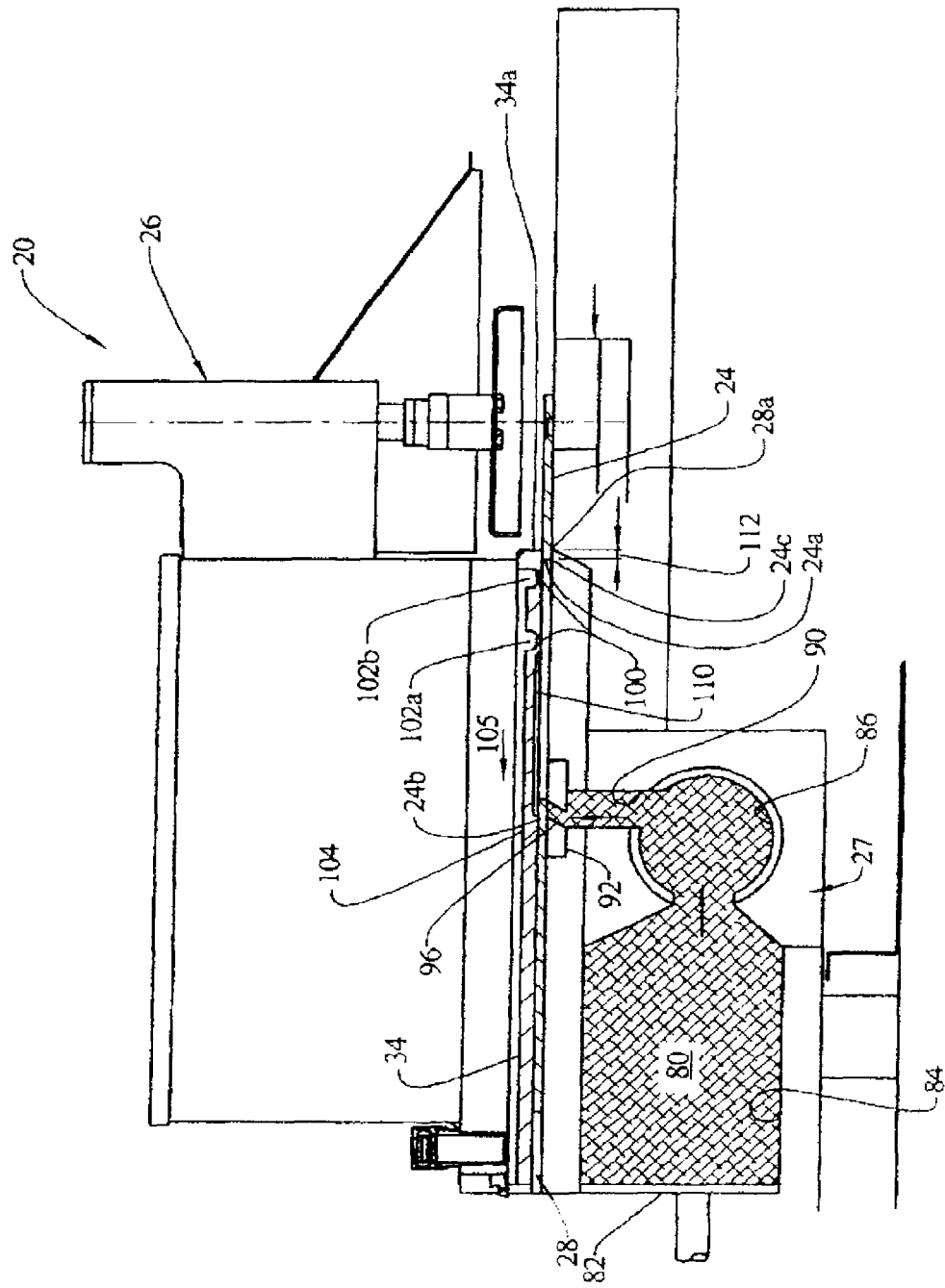
FIG. 1 is a sectional view of the food patty-forming machine of the invention with a mold plate in a seal off position just prior to reaching a start of filling position.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Machine Overview

Figure 2:
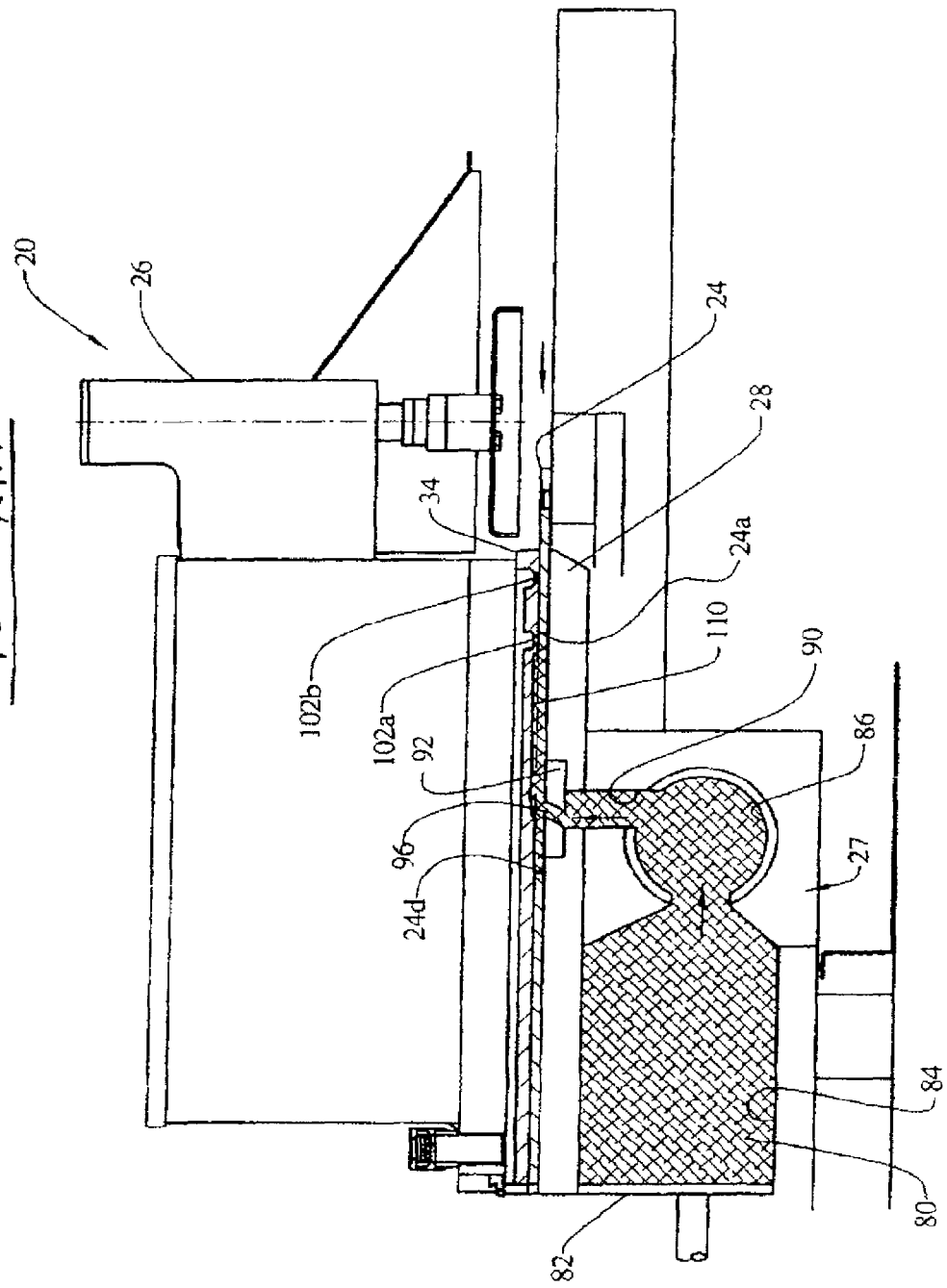
FIG. 2 is a sectional view of the food patty-forming machine of the invention with a mold plate in a fill position.
Figure 3:
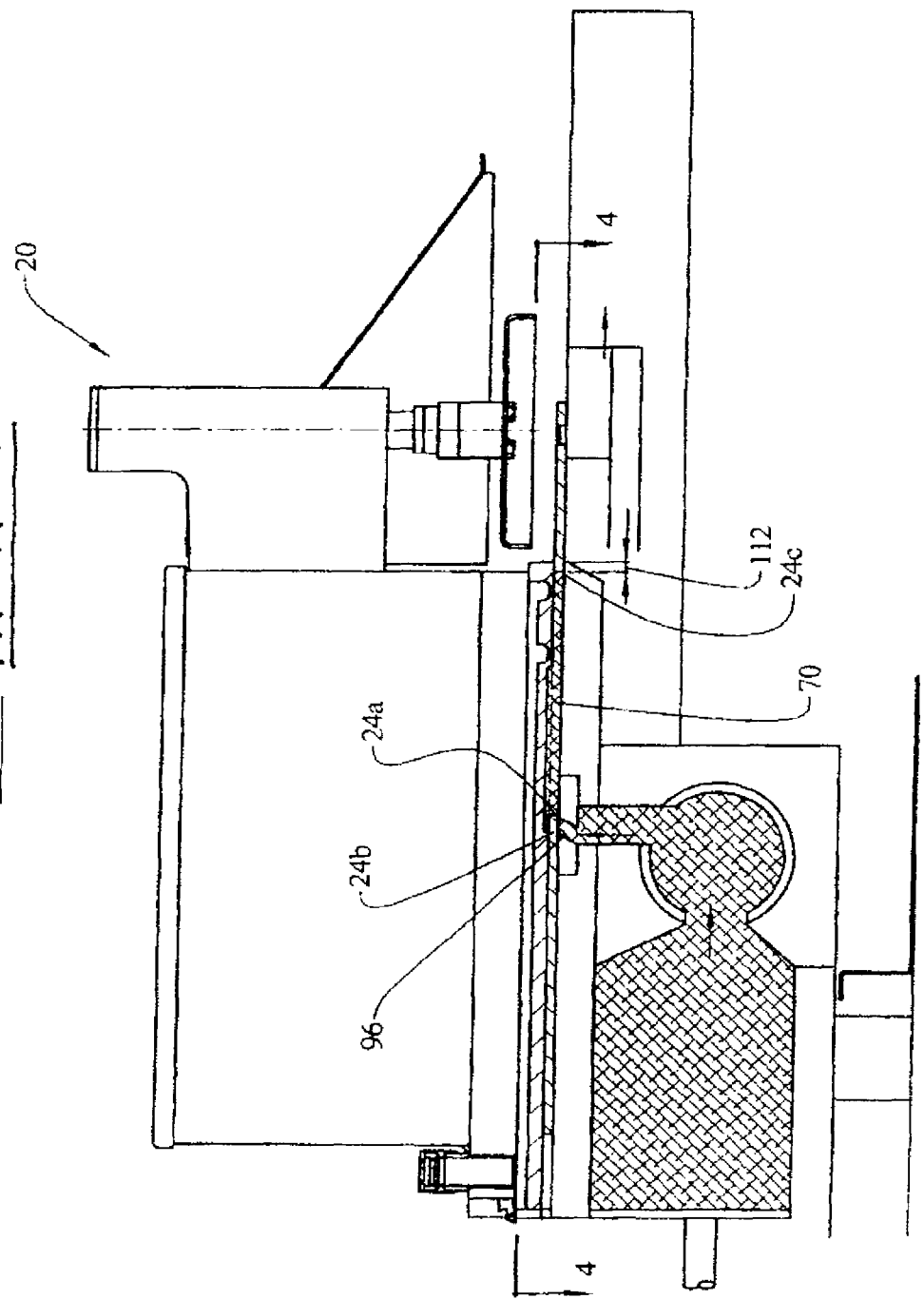
FIG. 3 is a sectional view of the food patty-forming machine of the invention with a mold plate in a seal off position just after leaving an end of filling position.

FIG. 1 illustrates a food patty-forming machine 20 of a type such as described in U.S. Pat. Nos. 4,329,828, 6,416,314, and 6,749,421, herein incorporated by reference. The machine 20 includes a mold plate 24 driven to reciprocate in a horizontal plane by drive means (not shown), such as by a pneumatic cylinder, or a motor driven, cam-operated, pivoting lever, or other means such as described in U.S. Pat. Nos. 3,952,478; 4,054,967; 4,182,003; and 4,329,828, and PCT published applications WO 99/62344 and WO 2005/02766782 A2, as herein incorporated by reference. The mold plate 24 reciprocates between the positions shown in FIG. 1 and FIG. 4. FIG. 2 and FIG. 3 show intermediate positions.

Figure 4:
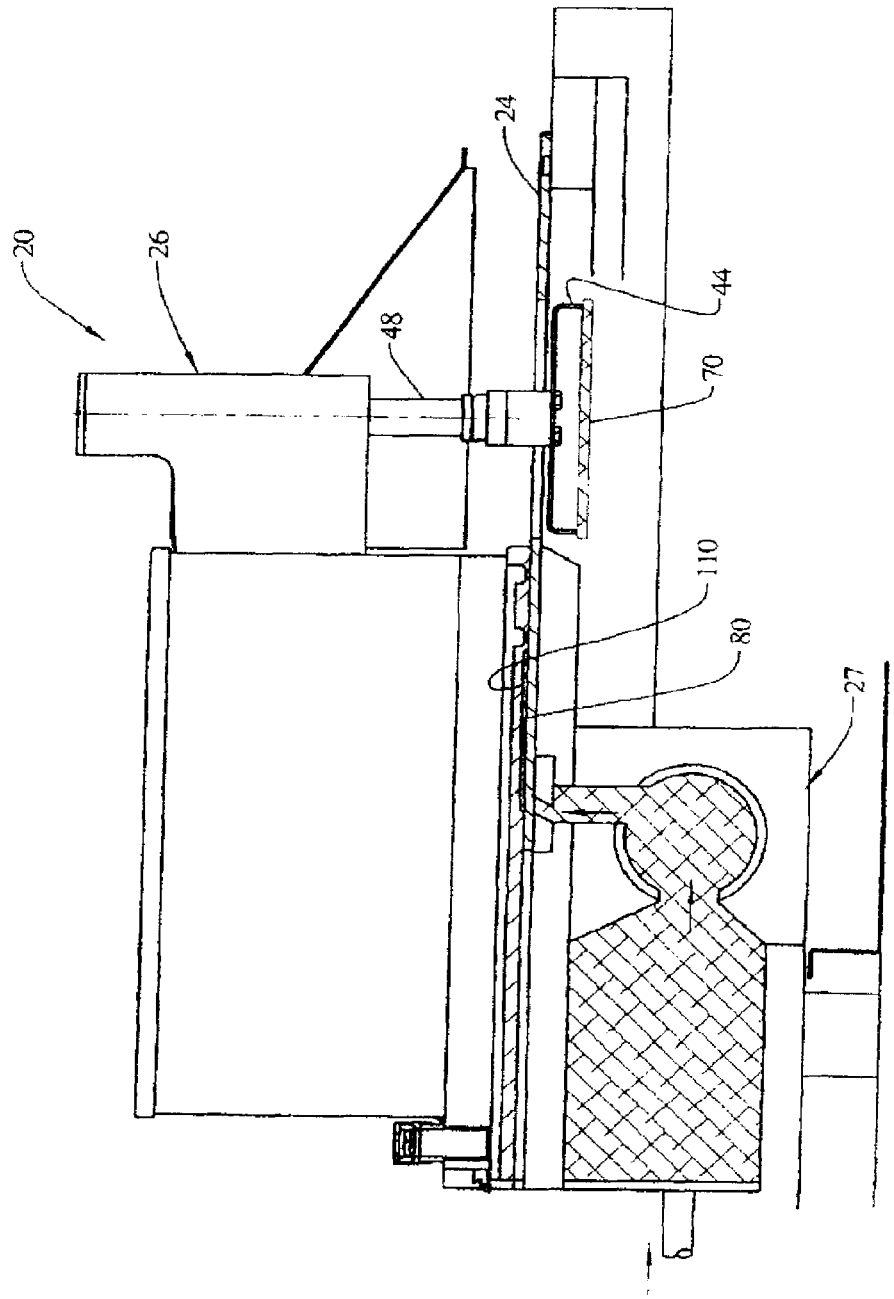
FIG. 4 is a sectional view of the food patty-forming machine of the invention with a mold plate in a patty knock out position.

Advantageously, the mold plate 24 includes a plurality of cavities 24a, such as four as shown in FIG. 4, although a single cavity is also encompassed by the invention. The cavities 24a can be any shape, such as round or square.

The mold plate is located between a patty knock out apparatus 26 and a food product filling apparatus 27. The mold plate 24 is carried by a machine top plate or support plate 28 and guided on a top side thereof by a breather plate 34. The breather plate of U.S. Pat. No. 6,416,314, which is incorporated by reference, may also be used in place of breather plate 34. The knock out apparatus 26 is mounted above the breather plate 34.

The food product filling apparatus 27 includes: a plunger 82, a cylinder 84, a manifold 86, a delivery slot 90, and a fill slot insert plate 92 that defines a fill slot 96. Food product 80 is pressurized by the plunger 82 throughout the cylinder 84, the manifold 86, the delivery slot 90, and the fill slot 96.

The mold plate 24 is illustrated in FIG. 1 in a seal off position, moving to the left, in the direction 105 just before filling begins, i.e., before the fill slot 96 is in registry with the cavities. Once the fill slot 96 is in registry with the cavities 24a, filling of the pressurized food product into the cavities will begin.

In the mold plate position of FIG. 1, with the fill slot 96 sealed, forward edges 24c of the cavities 24a are inset by a margin 112 from the confines of a front edge 34a of the breather plate 34 and a front edge 28a of the support plate 28. This margin can be about 0.3 inches. The margin ensures that before the slot 96 is uncovered, the cavities are no longer located outside the breather plate 34, i.e., are no longer exposed to the atmosphere. The pressurized food product will thus not leak or be sprayed outside the mold plate.

FIG. 2 illustrates the machine 20 of FIG. 1 with the mold plate 24 retracted completely to the left in a cavity fill position. In this position, the cavities 24a are located above the cavity fill slot 96 of the food product filling apparatus 27. Food product 80 is pumped by the plunger 82, through the cylinder 84, and into the manifold 86. Food product 80 passes from the manifold 86 into the delivery slot 90 and out of the fill slot 96.

At the position shown in FIG. 2 the fill recess 110 is within the longitudinal confines of the cavities 24a. A solid rearward edge 24d of the cavities 24a is behind the fill slot 96. During travel of the mold plate 24 from the position shown in FIG. 1 to the position shown in FIG. 2, the cavity 24a and a recess 110 on a bottom of the breather plate 34 are filled with food product 80. The recess 110 decreases longitudinal flow resistance by increasing total transverse flow area of the combined cavity 24a/recess 110 to fill food product into the cavity and recess.

FIG. 3 illustrates the mold plate 24 having moved to the right to a seal off position. The mold plate portion 24b has sealed the fill slot 96 and the margin 112 is present. The slot 96 will remain sealed off as the mold plate moves to the right to the knock out position of FIG. 4. The mold plate will remain sealed off until the mold plate then reverses and moves in the direction 105 and reaches a position just to the left of the position of FIG. 1.

FIG. 4 illustrates the mold plate 24 at the knock-out position. The knock out apparatus 26 includes at least one knock out plunger 44 that is driven to reciprocate in a vertical direction. The plunger 44 is carried by a knock out rod 48 that is driven by the mechanical system (not shown) of the knock out apparatus 26. For example, a knock out apparatus as described in U.S. Pat. No. 4,329,828, and PCT published application WO 2005/02766782 A2, herein incorporated by reference, can be used. The movement of the plunger 44 is adapted and synchronized to register with the mold cavity 24a in the mold plate 24. A food patty 70, formed in the mold cavity 24a, as described below, is thereby pushed from the cavity to be stacked below the mold plate and/or conveyed to a remote location.

Advantageously, the mold plate 24 includes a plurality of cavities 24a and a plurality of plungers 44 are reciprocated together to knock out a plurality of patties 70 from the cavities.

Prior Art

Figure 5A:
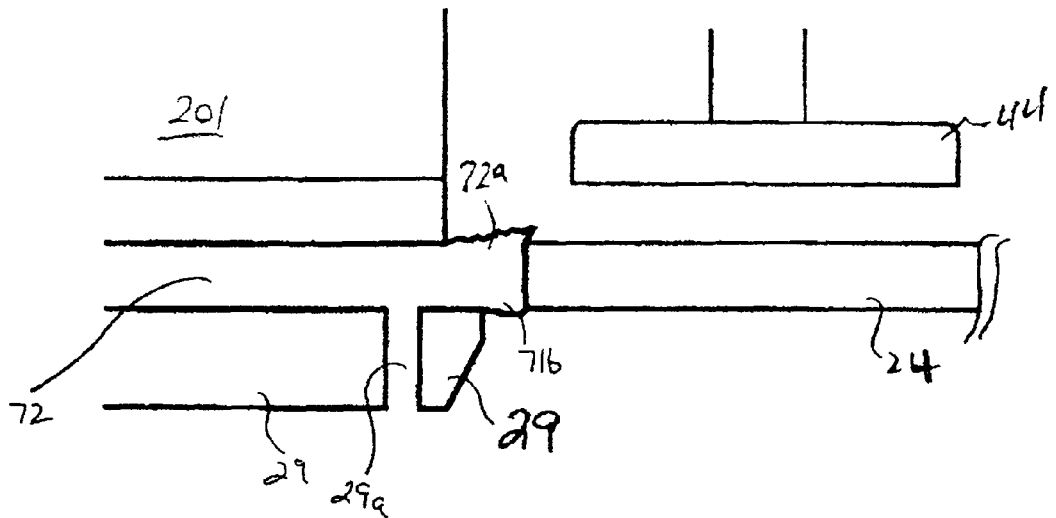
FIG. 5A is a sectional schematical side view of a food patty-forming machine with an escape passage provided below the mold plate.
Figure 5:
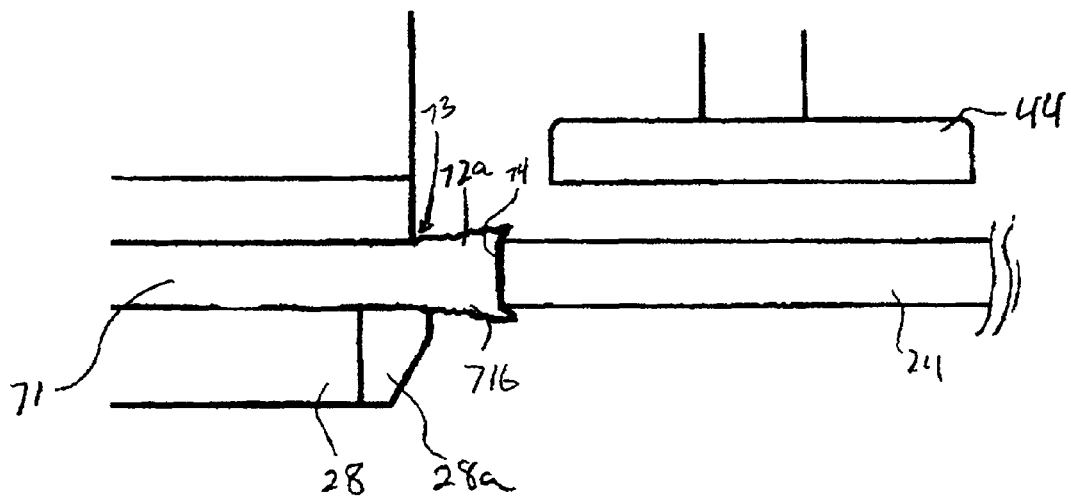
FIG. 5 is a sectional schematical side view of a food patty-forming machine without an escape passage.

FIG. 5 shows a machine that does not provide an antilip escape passage. Pressurized food product and trapped or entrained air fills cavity 71. When the mold plate 24 moves toward a knock out position, there is a point 73 when the foremost part 74 of the mold cavity is exposed to the outside air. When this exposure occurs the pressurized air instantly is released from the cavity causing an upper lip 72a and a lower lip 71b to be formed on the patty 71.

FIG. 5A shows a prior art arrangement providing a lower antilip escape passage 29a. However, an antilip escape passage located below the mold plate 24 tends to reduce or eliminate the pressure created lower lip 71b on the patty 72 more than the upper lip 72a as shown in FIG. 5A.

However, the present inventor recognizes that it is preferred that, if any lip is formed, the lip be on the bottom 71b of the patty. This is preferred because, when patties are dropped onto, and move along a conveyor (not shown) after being ejected from the mold pate 24 by the plungers 44 the lower lip tends to be flattened whereas, an upper lip 72a is more readily visible.

Antilip Breather Plate System

Figure 6:
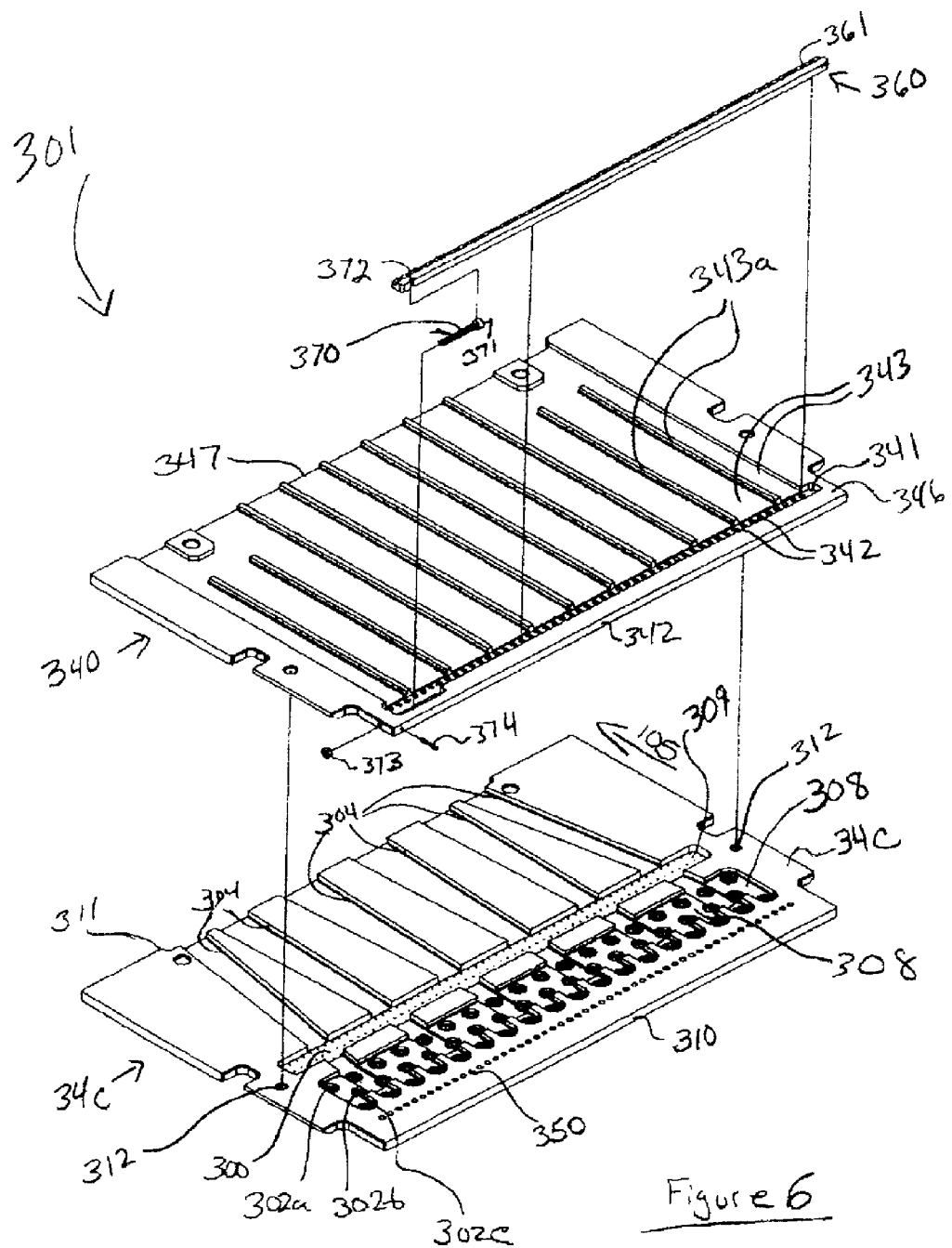
FIG. 6 is a perspective view of the antilip breather plate system of the present invention.

FIG. 6 shows the antilip breather plate system 301 of the present invention. The system 301 will fit suitably in the machine 20 of FIGS. 1-4. The system 301 would replace the breather plate 34 of FIGS. 1-4. Also, the system 301 would fit in the machine as shown in U.S. Pat. No. 6,416,314, which is incorporated by reference, replacing breather plate 34 of that invention and/or incorporating features of that breather plate.

Figure 7:
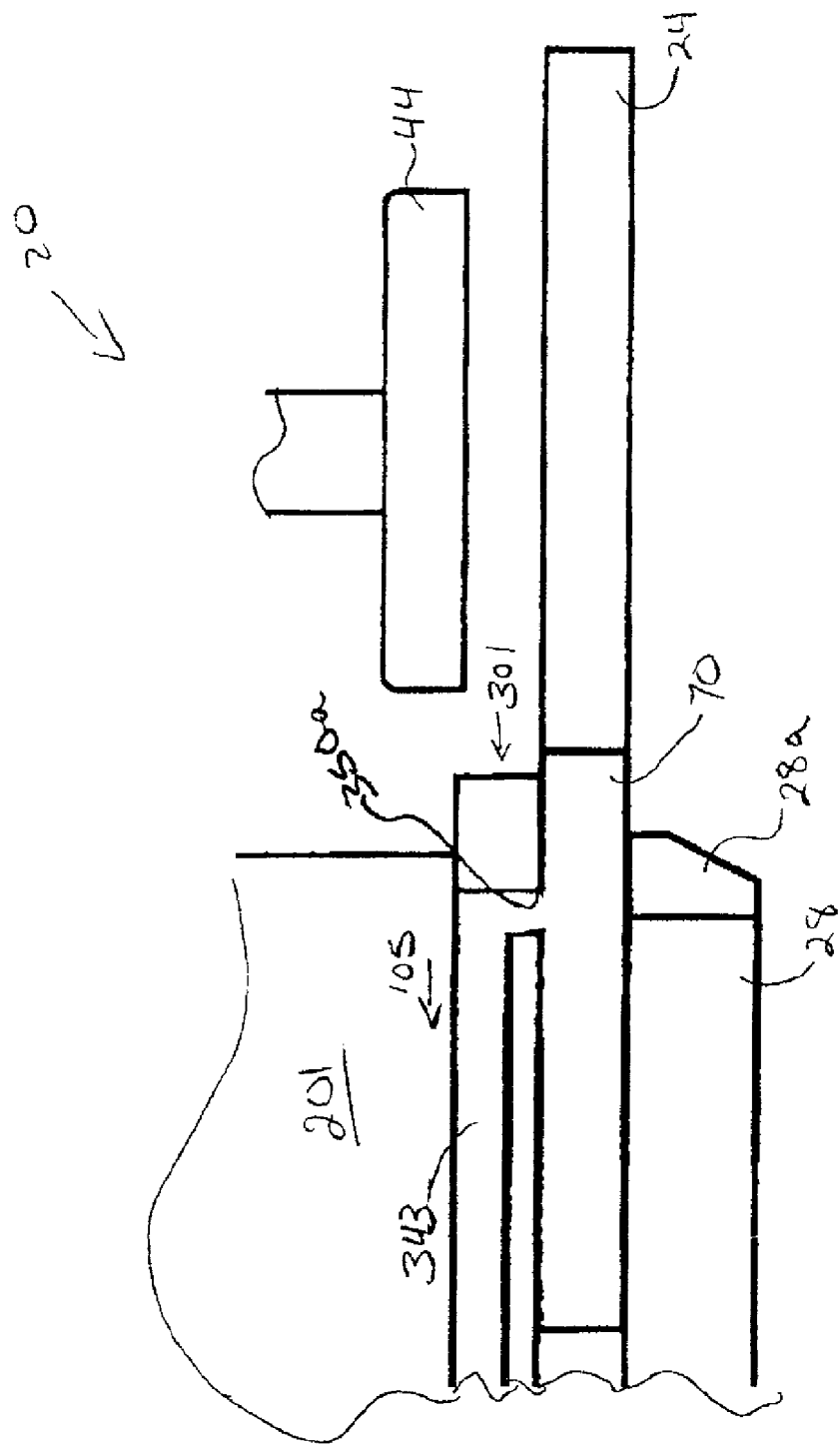
FIG. 7 is a sectional schematical side view of a food patty-forming machine with an escape passage provided above the mold plate.

FIG. 7 provides a schematical side view of the system 301. The system 301 is located above the top plate 28, above the mold plate 24 and below the mold cover 201.

The system 301 has an antilip escape passage opening 350a that allows of the raised leading edge of a formed patty 70 to be removed from the patty prior to leaving the machine 20. This improves the formed shape of the patty. It improves weight accuracy of the formed patty 70. The removed material that passes through the antilip opening 350a will travel back through passage recycle channels 343 to be recycled internally in the machine 20, thereby reducing waste and increasing yield. The antilip escape passage opening is adjustable to control the amount of air and entrained food product that is removed from the patty. The opening is controlled such that only a sufficient amount of air and food product is removed to prevent a lip and not so much as to cause a depression in the patty.

The antilip breather plate system 301 comprises a breather plate 34c, a passage plate 340, an adjusting bar 360, an adjusting screw 370, a locking nut 373, and a locking set screw 374. The escape passage is defined in part by at least one breather antilip hole 350 of the breather plate 34c, at least one passage antilip hole 342 of the passage plate 340, and at least one recycle channel 343 of the passage plate 340. While the embodiment shown provides an antilip system 301 with a passage plate and a breather plate, it is encompassed within the invention to provide a escape passage in a single relief plate that faces the mold plate. The single relief plate may comprise the functions of a breather plate and a passage plate or may be separate therefrom. Also the escape passage might be formed within a wall of the patty forming machine that is adjacent to the mold plate.

Breather Plate

The breather plate 34c includes a plurality of first breather holes located within three rows of first recesses 302a, 302b, 302c within a second recessed area 308. Vent holes or breather holes 300 are located in each recess. The vent holes 300 are numbered and sized to adequately exhaust air from the cavities during filling, but not sized too large to pass significant amounts of food product. The first recesses 302a, 302b, 302c within a second recessed area 308 allow for easier and more complete cleaning of food particles from the breather holes 300 due to a reduced depth and lowered aspect ratio of the breather holes 300.

A plurality of breather recycle channels 304 intersect the second recessed area 308. The recycle channels 304 may be recessed at a depth greater than the second recessed area 308 but less than a depth of the first recesses 302a, 302b, 302c. The first recesses 302a, 302b, 302c within a second recessed area 308 are open on top to recycle channels 304, which are configured to transport air and small food particles in the direction 105 back to the food product hopper (not shown) or other suitable location. At the position of the mold plate shown in FIG. 1, the breather holes 300 are open between the first recesses 302a, 302b, 302c and the cavities 24a.

The recycle channels run from the second recessed area 308 near the front edge 310 of the breather plate 34c toward the back edge 311 of the breather plate 34c. In between the second recessed area 308 and the back edge 311 the recycle channels are intersected transversely be a third recessed area 309. The third recessed area 309 may be smaller in area than the second recessed area 308. The third recessed area 309 also has vent holes 300 but the vent holes are not within any further recessed areas like is the case with first recesses 302a, 302b, 302c within the second recessed area 308.

The breather plate comprises one or more breather antilip holes 350 extending in a row across a width of the breather plate. The breather antilip holes 350 may be near the front edge 310 of the breather plate 34c.

Passage Plate

The passage plate 340 connects to the top of the breather plate 34c. In one embodiment, the passage plate 340 connects to the top of the breather plate 34c at two or more connecting points 312. The breather antilip holes 350 of the breather plate correspond and align with passage antilip holes 342 in the passage plate 340.

The passage antilip holes 342 extend in a row across a width of the passage plate 340 in an antilip hole channel 341. The channel is recessed from the top surface 346 of the passage plate. One or more passage recycle channels 343 extend from the antilip hole channel 341 toward the back edge 347 of the passage plate 340. The escape passage opening is adjustable to control the amount of air and entrained food product that is removed from the patty and sent back through the recycle channels 343. The passage recycle channels 343 are recessed from the top surface 346 of the passage plate 340. The passage recycle channels 343 may be separated by dividers 343a. The dividers may be co-planer with the passage plate top surface 346. In one embodiment, the passage recycle channels 343 may be recessed less than the antilip hole channel 341.

Adjusting Bar

As shown in FIG. 8, the adjusting bar or element 360 fits within the antilip hole channel 341 of the passage plate 340. The adjusting bar 360 has a plurality of adjusting bar holes 361. The adjusting bar holes 361 correspond to the passage antilip holes 342 and the breather antilip holes 350.

FIGS. 9 through 11 show the adjusting bar in a full open position within the antilip hole channel 341 of the passage plate 340. In the full open position the adjusting bar holes 361 are fully aligned with the passage antilip holes 342 so that maximum pass-through area is provided. FIG. 12 show the adjusting bar 360 in a full closed position where the adjusting bar 360 is blocking and completely covering the passage antilip holes 342.

The adjusting screw 370 moves the adjusting bar 360 between the full open, full closed positions, and a plurality of intermediate positions. The head 371 of the adjusting screw 370 fits in a cutout area 347 of the passage plate and also within an engaging notch 372 of the adjusting bar 360.

In one embodiment, the cutout area 347 adjoins a portion of the antilip hole channel 341. The passage plate may comprise a first edge 348 across the width of the passage plate from a second edge 349. The cutout area 347 adjoins the antilip hole channel 341 at a corner of the antilip hole channel 341 nearest the first edge 348 and the front edge 342 of the passage plate. The cutout area 347 extends farther toward the front edge 342 than the antilip hole channel 341. In another embodiment, the cutout area 347 may adjoin the antilip hole channel 341 at a corner of the antilip hole channel 341 nearest the second edge 349 and the front edge 342 of the passage plate.

The adjusting screw 370 is threaded through threads 377 (FIG. 10) that extend from the cutout area to the first edge 348. The head 371 may comprise a hex head with a socket for receiving a hex key or Allen wrench that adjusts the position of the head 371 and thereby adjusts the position of the adjusting bar 360. The adjusting bar may be adjusted by the adjusting screw 370 to a number of intermediate positions between the full open position and full closed position.

In one embodiment, as shown in FIGS. 8 and 10, the adjusting bar 360 abuts a first edge 346 of the antilip hole channel 341 when in the full open position. In a full open position the adjusting bar 360 abuts a second edge 345 of the antilip hole channel 341 when in a full closed position.

The locking set screw 374 is threaded through a hole 374a in the front 342 of the passage plate to intersect the threaded hole 377 of the adjusting screw 370. Tightening the locking screw 374 against the adjusting screw will prevent the adjusting screw from rotating during operation. Also the locking nut 373 is threaded on an end of the adjusting screw 370 opposite the head 371 and secures against the first edge 348 of the passage plate to secure the adjusting screw 370.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A patty-forming apparatus, comprising:
a mold plate having a mold cavity through a thickness thereof;
a mold plate support structure carrying said mold plate and guiding said mold plate for reciprocating motion along a longitudinal direction, said structure including a wall facing said mold plate, said mold plate reciprocating along said wall;
a food product delivery channel carried by said structure and arranged on one side of the mold plate, said delivery channel having a fill opening into said cavity when said mold plate is in a fill position with respect to said structure; and
the wall having an adjustable escape passage for adjustably relieving pressure within the mold cavity made adjustable by an adjusting element that defines the adjustable escape passage which can be positioned to vary the degree to which the escape passage is open, the adjustable escape passage has at least three selectable degrees of pressure relief depending on three positions of the adjusting element and the escape passage comprises at least one antilip hole and the adjusting element for opening or closing the at least one antilip hole to vary the degree of pressure relief.

2. The apparatus according to claim 1, wherein the escape passage comprises at least one passage recycle channel, the passage recycle channel connecting to a hopper for recycling food product entrained in air relieved into the escape passage.

3. The apparatus according to claim 1, where the adjusting element has a open position, a closed position, a plurality of intermediate positions between the open position and the closed position;
the open position, the closed position, and at least one of the plurality of intermediate position correspond to the at least three selectable degrees of pressure relief of the escape passage.

4. The apparatus according to claim 1, wherein the wall comprises a passage plate, the passage plate comprising at least one passage plate antilip hole, and at least one passage recycle channel connecting to a hopper for recycling food product entrained in air relieved into the escape passage, the at least one passage plate antilip hole at least partially defines the escape passage.

5. The apparatus according to claim 4, wherein the passage plate comprises an antilip hole channel, the antilip hole channel comprising the at least one passage plate antilip hole, the adjusting element comprising an adjusting bar movable within said antilip hole channel to vary the degree to which the at least one antilip hole is open.

6. The apparatus according to claim 5, wherein the adjusting bar comprises adjusting bar holes that correspond to the one or more passage plate antilip hole, said adjusting bar holes align with the one or more passage plate antilip holes when the adjusting bar is in a full open position.

7. The apparatus according to claim 1, wherein the wall comprises a breather plate facing said mold plate, said breather plate having at least one breather hole therethrough open to said cavity when said mold plate is in said fill position, the breather plate comprising breather antilip holes that at least partially define the escape passage.

8. The apparatus according to claim 4, wherein the wall comprises a breather plate between the mold plate and the passage plate, said breather plate having at least one breather hole therethrough open to said cavity when said mold plate is in said fill position, the breather plate comprising breather antilip holes that at least partially define the escape passage.

9. A patty-forming apparatus, comprising:
a mold plate having a mold cavity through a thickness thereof;
a mold plate support structure carrying said mold plate and guiding said mold plate for reciprocating motion along a longitudinal direction, said structure including a wall facing said mold plate, said mold plate reciprocating along said wall;
a food product delivery channel carried by said structure and arranged on a side of the mold plate opposite the wall, said delivery channel having a fill opening into said cavity when said mold plate is in a fill position with respect to said structure; and
the wall having an adjustable escape passage for adjustably relieving pressure within the mold cavity made adjustable by an adjusting element that defines the adjustable escape passage which can be positioned to vary the degree to which the escape passage is open, the adjustability of the adjustable escape passage is independent of the position of the mold plate the escape passage comprises at least one antilip hole and the adjusting element positionable with respect to the at least one antilip hole.

10. The apparatus according to claim 9, wherein the escape passage comprises at least one passage recycle channel, the passage recycle channel connecting to a hopper for recycling food product entrained in air relieved into the escape passage.

11. The apparatus according to claim 9, where the adjusting element has a open position, a closed position, a at least one selectable intermediate position between the open position and the closed position.

12. The apparatus according to claim 9, wherein the wall comprises a passage plate, the passage plate comprising at least one passage plate antilip hole, and at least one passage recycle channel connectable to a hopper for recycling food product entrained in air relieved into the escape passage, the at least one passage plate antilip hole at least partially defines the escape passage.

13. The apparatus according to claim 9, wherein the passage plate comprises an antilip hole channel, the antilip hole channel comprising the at least one passage plate antilip hole, the adjusting element comprising an adjusting bar movable within said antilip hole channel.

14. The apparatus of claim 1, wherein the escape passage having an entry configured to be in communication with the mold cavity during at least a portion of a mold cycle, the adjusting element is located adjacent to an entry of the escape passage.

\* \* \* \* \*